United States Patent [19]

Nakashin

[11] 4,244,895
[45] Jan. 13, 1981

[54] LEAK REPAIRING PROCESS FOR UNDERGROUND PIPE

[76] Inventor: Yasushi Nakashin, 5-9-10, Soya, Ichikawa-shi, Chiba-ken, Japan

[21] Appl. No.: 23,749

[22] Filed: Mar. 26, 1979

[30] Foreign Application Priority Data

Mar. 25, 1978 [JP] Japan .................................. 53/33602

[51] Int. Cl.$^3$ ............................................. F16L 1/00
[52] U.S. Cl. ......................................... 264/36; 138/97
[58] Field of Search ............................ 264/36; 138/97

[56] References Cited

U.S. PATENT DOCUMENTS 3,356,777 12/1967 Barrett ................................... 264/36

FOREIGN PATENT DOCUMENTS 1161407 8/1969 United Kingdom .

*Primary Examiner*—Thomas P. Pavelko
*Attorney, Agent, or Firm*—Finnegan, Henderson, Farabow, Garrett & Dunner

[57] ABSTRACT

A method of repairing leaks in underground sewer pipe which includes the steps of closing the pipe at an upstream and a downstream position forming an enclosed section, filling the enclosed section with grout under pressure from a source and causing said grout to ooze through the leaks, replacing the grout in the enclosed section with a non-hardening liquid under pressure which prevents the grout which has oozed through the leaks from passing back into the enclosed section, and removing the non-hardening liquid from the enclosed section after the grout has hardened and sealed the leaks.

2 Claims, 2 Drawing Figures

LEAK REPAIRING PROCESS FOR UNDERGROUND PIPE

BACKGROUND OF THE INVENTION

The present invention relates to a process for repairing leaks in underground pipes.

In this field there is already known a process for repairing leaks in pipes which comprises the steps of inserting a so-called air-packer in a contracted state into the pipe, expanding the air-packer at the location of the leak thereby closing the inside of the pipe at both the upstream and the downstream side of the leak, pressurizing grout through a pipe locally into the leak location and hardening the grout, and contracting said air-packer for extracting it from the pipe after the grout is hardened.

However, the above-mentioned process requires that each leak be located and also requires that the above-mentioned procedure be performed for each leak. This is inefficient, particularly when plural leaks are scattered within a short section of pipe.

The present invention provides a novel process allowing simple, economical and simultaneous repair of multiple leaks scattered over an extended section of an underground pipe. In the following description, the present invention will be explained in detail with respect to a preferred embodiment thereof applied to a sewer pipe as illustrated in the attached drawings.

DETAILED DESCRIPTION

Figure 1:
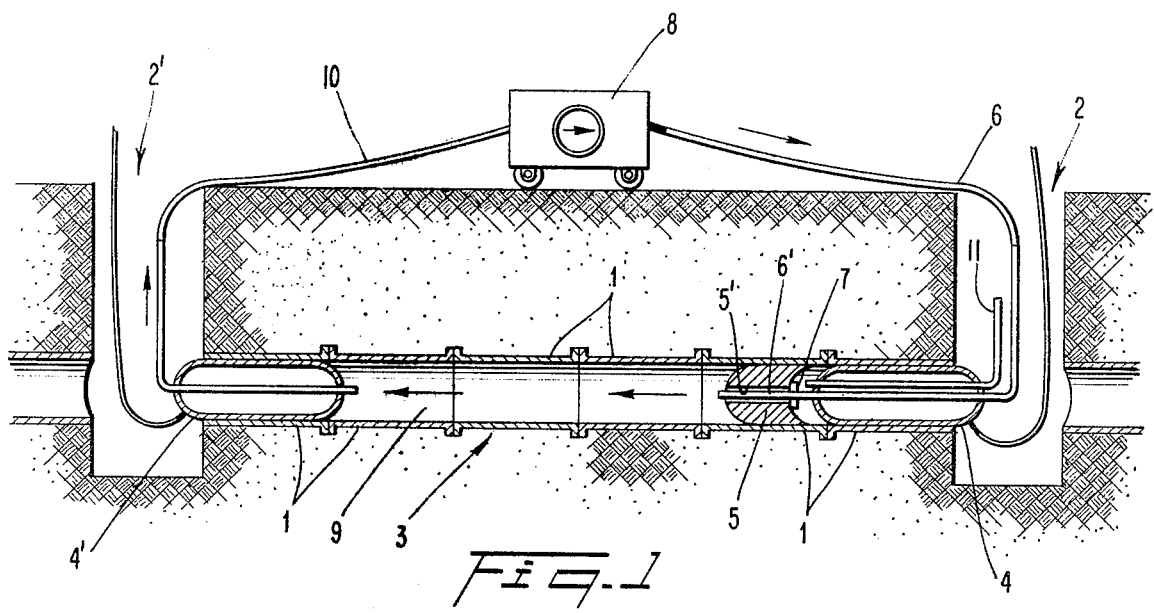
FIG. 1 is a diagrammatic illustration showing the step of grout circulation in the present invention.
Figure 2:
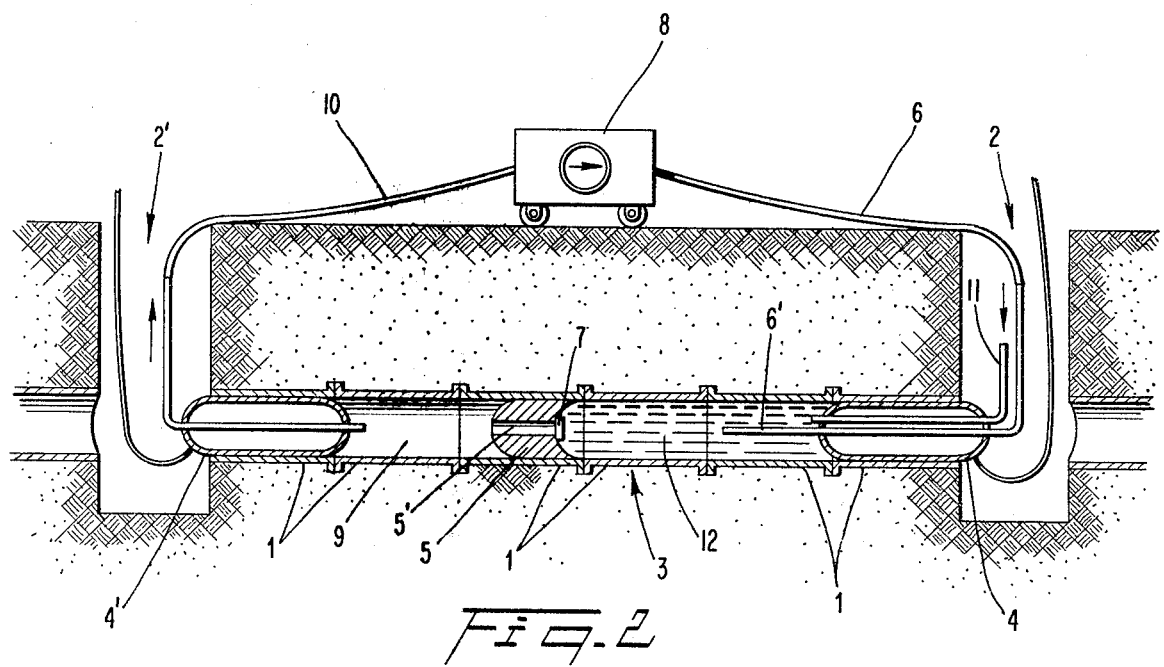
FIG. 2 is a view similar to FIG. 1 showing the step of supplying non-hardening liquid and ejecting remaining grout in this invention.

In FIG. 1 there are shown plural sewer pipes 1 serially connected to constitute an underground sewer system 3 provided between an upstream manhole 2 and a downstream manhole 2' and showing plural leaks therein. According to the present invention, openings at both ends of the sewer system 3, i.e. an opening at the upstream manhole 2 and an opening at the downstream manhole 2', are closed by expanding air-packers 4, 4' positioned inside said openings to define an enclosed section therebetween. A piston 5 is provided adjacent one end of the enclosed section, for example, adjacent upstream air-packer 4. A grout feed pipe 6, penetrating through upstream air-packer 4, has a leading end 6' inserted into an opening 5' in the piston 5. A valve 7 is positioned in piston opening 5' to open or close the opening at the inlet side thereof.

Grout 9 is supplied under pressure from a grout regenerating-circulating apparatus 8 through the pipe 6 past upstream air packer 4 and piston 5 to fill the enclosed section of sewer 3 and is returned to the apparatus 8 by suction through a grout return pipe 10 which penetrates the downstream air-packer 4'. The grout 9 is regenerated in apparatus 8 and is again circulated to said grout feed pipe 6.

According to the present invention, grout 9 is of a slow-hardening type with a long hardening time, and does not harden in the sewer 3 because of constant flow of grout from the upstream end toward the downstream end but solidifies only when oozing out, due to the filling pressure, through leaks in the pipes 1 to the outside soil. The presence of leaks and the quantity thereof can be detected by the grout regenerating-circulating apparatus 8, which also performs the functions of control of the grout flow rate, pressure and hardening time of grout 9 and replenishment thereof.

After the grout circulates in the sewer system 3 for a determined time period, as described above, delivery of the grout to the feed pipe 6 is terminated. A non-hardening liquid 12 such as water or grout washing solution is then supplied through a non-hardening liquid feed pipe 11 which penetrates through the air-packer 4 into a space between the air-packer 4 and the piston 5, whereby the piston 5 is displaced toward the downstream side of the sewer system 3. The valve 7 is closed during this time to expel and return the remaining grout 9 to the apparatus 8 through the return pipe 10.

In this manner the grout in the interior of the sewer system 3 is replaced by the non-hardening liquid 12 under pressure which functions to prevent reverse flow of grout which has oozed through the leaks in pipes 1 into the outside soil back to the interior of sewer 3 together with the underground water. The above-mentioned state is maintained until the grout at the leak locations attains necessary solidification, whereupon the air-packers 4,4' are contracted and extracted from the sewer 3 to release the non-hardening liquid 12 toward the downstream end. In this manner, the interior of sewer 3 is washed and the leaks over the entire length of sewer 3 between the manholes 2,2' are simultaneously and securely repaired.

Although in the foregoing embodiment the grout is made to flow from the upstream side of sewer 3 to the downstream side, it is naturally possible to employ a flow in the opposite direction. Further it is possible to feed the non-hardening liquid 12 from the downstream side, and to achieve the closing of pipe by any suitable means other than the air-packers.

As explained in the foregoing, the leak repair process of the present invention is featured by closing an upstream position and downstream position of underground sewer pipe constituting a fluid flow path to form an enclosed section therein, filling said enclosed section with grout under pressure thereby causing said grout to leak to the outside through the leaks in the pipe, and supplying a non-hardening liquid such as water into said enclosed section under pressure from an end thereof while ejecting grout remaining in said enclosed section from the other end thereof thereby replacing said grout with said non-hardening liquid, and allows simple, economical and simultaneous repair of multiple leaks scattered over an extended section of the pipe.

Also, the replacement of grout with the non-hardening liquid achieved by supply thereof under pressure coupled with simultaneous ejection of remaining grout prevents the reverse flow of grout having oozed into the outside soil again into the pipe together with underground water, thus ensuring secure repair, and further enables to wash off the grout remaining in the pipe with the non-hardening liquid.

What is claimed is:

1. A repairing process for leaking underground pipe which comprises the steps of closing an upstream position and a downstream position of said underground pipe constituting a fluid flow path to form an enclosed section therein, filling said enclosed section with grout of a slow-hardening type with a long hardening time under pressure thereby causing said grout to leak to the outside through the leaking portion of said pipe, keeping said grout flowing under pressure by utilization of grout regenerating-circulating apparatus for a predetermined period, supplying anon-hardening liquid such as water under pressure into said enclosed section from one end thereof while ejecting grout remaining in said enclosed section from the other end thereof thereby substituting said non-hardening liquid for said grout, and keeping said non-hardening liquid under pressure for sufficient time until said grout has hardened.

2. The process as defined in claim 1 which further includes the step of removing said non-hardening liquid from said enclosed section after said grout has hardened.

* * * * *